United States Patent [19]

Kitamura et al.

[11] 4,282,981
[45] Aug. 11, 1981

[54] BRIGHT WELDED SEAM CAN OF TINPLATE

[75] Inventors: Yoichi Kitamura; Hisashi Hotta, both of Yokohama; Makoto Ito, Kawasaki, all of Japan

[73] Assignee: Toyo Seikan Kaisha, Ltd., Tokyo, Japan

[21] Appl. No.: 139,632

[22] Filed: Apr. 11, 1980

[30] Foreign Application Priority Data

Apr. 12, 1979 [JP] Japan .................................. 54-43605

[51] Int. Cl.³ ............................................. B65D 7/38
[52] U.S. Cl. ....................................... 220/75; 219/64; 220/DIG. 19; 403/271; 428/556; 428/629; 428/633; 428/687; 428/648
[58] Field of Search ............... 428/556, 586, 646, 648, 428/629, 632, 633, 687, 939; 219/64, 83, 118; 403/271, 272; 220/75, DIG. 19

[56] References Cited

U.S. PATENT DOCUMENTS

| | | | |
|---|---|---|---|
| 3,468,453 | 9/1969 | Erlandson | 219/64 |
| 4,104,135 | 8/1978 | Fujimalu et al. | 428/648 |
| 4,190,504 | 2/1980 | Usui | 428/648 |
| 4,193,530 | 3/1980 | Holmes | 428/648 |
| 4,223,196 | 9/1980 | Erlandson et al. | 219/64 |

Primary Examiner—Michael L. Lewis
Attorney, Agent, or Firm—Sherman & Shalloway

[57] ABSTRACT

Disclosed is a bright welded seam can of tinplate having a side seam formed by welding, wherein each of the inner and outer surfaces of the side seam has an outermost surface layer having a thickness of 50 to 400 Å and being composed of oxides and a subsequent intermediate layer composed of an iron-tin alloy, which has a thickness corresponding to 5 to 100% of the thickness of the whole tin layer in the tinplate blank, and wherein the inner and outer surfaces of the side seam have a reflectance corresponding to at least 60% of the reflectance of the tinplate.

This bright welded seam can is excellent in the appearance of the seam, the corrosion resistance and the adhesion of the coating.

4 Claims, 4 Drawing Figures

BRIGHT WELDED SEAM CAN OF TINPLATE

BACKGROUND OF THE INVENTION (1) Field of the Invention

The present invention relates to a bright welded seam can of tinplate which is excellent in the appearance of the seam, the corrosion resistance and the adhesion of the coating. More particularly, the present invention relates to a bright welded seam can in which the above-mentioned characteristics are improved by forming an oxide surface layer having a specific thickness and an iron-tin alloy intermediate layer on each of the inner and outer surfaces of the side seam.

(2) Description of the Prior Art

A tin-plated steel sheet, that is, a tinplate sheet, is a material excellent in the corrosion resistance, the coating adhesion and the processability and has been used from old as a can blank. Tinplate cans are ordinarily formed according to a method comprising a can blank into a cylinder and bonding both the side edges of the cylinder by lap seam welding, lock seam welding or combination thereof while using a solder. According to this can forming method, a considerable area is necessary for the seam portion, and the method therefore includes a problem in connection with saving of the resource. Furthermore, in case of food cans, bad influences are brought about by soldering. Therefore, a can forming method not using a solder has been desired in the art.

Instead of soldered cans, seamless cans prepared by draw-ironing have been used in certain fields. However, deformation of the side wall by application of pressure is extreme in seamless cans, and hence, they cannot be conveniently used as vacuum cans, that is, cans of the type where canned contents are subjected to retort sterilization. As another instance that can be used instead of the soldered can, there is known a welded can formed by lap-bonding both the side edges of a can body by welding. The area of the lap seam portion in such welded can is much smaller than in the soldered can and this lap bonding method is advantageous in that a particular adhesive, for example, a solder, need not be used. However, known welded seam cans of tinplate are still insufficient in the appearance of the seam, the corrosion resistance and the coating adhesion.

In the manufacture of welded seam cans, lap portions prepared by forming a can blank into a cylinder are subjected to electric resistance welding by passing the lap portions through between a pair of upper and lower electrode rollers or passing the lap portions through between a pair of upper and lower electrode rollers via an electrode wire. However, when tinplate is used as the can blank, a tin plating layer is fused at the welding step and fused tin is transferred to the electrode member or is scattered in the form of fume, with the result that the protecting effect of the tin plating layer is lost and black or blue iron oxide (probably $Fe_3O_4$) is readily formed on the surface. A film of such iron oxide comes to have a thickness of 700 to 3000 Å, and such defects as bad appearance of the seam, reduction of the corrosion resistance and insufficient adhesion of the coating result.

SUMMARY OF THE INVENTION

It is therefore a primary object of the present invention to provide a bright welded seam can of tinplate excellent in the appearance of the seam, the corrosion resistance and the coating adhesion.

Another object of the present invention is to provide a bright welded seam can of tinplate, in which the thickness of an oxide surface layer formed on each of the inner and outer surfaces of the side seam by welding is controlled to a much smaller value than in conventional welded cans and an intermediate layer composed of an iron-tin alloy having a fine texture and a high corrosion resistance is formed instead of an oxide layer formed in conventional welded cans.

Still another object of the present invention is to provide a bright welded seam can of tinplate which is especially useful as a food can to be subjected to retort sterilization.

In accordance with the fundamental aspect of the present invention, there is provided a bright welded seam can of tinplate having a side seam formed by welding, wherein each of the inner and outer surfaces of said side seam has as an outermost layer a surface layer having a thickness of 50 to 400 Å and being composed of colorless oxides of iron and tin and an intermediate layer composed of an iron-tin alloy, which has a thickness corresponding to 5 to 100%, especially 15 to 70%, of the thickness of the whole tin layer in the tinplate blank, and wherein said inner and outer surfaces of the side seam have a reflectance corresponding to at least 60%, particularly at least 80%, of the reflectance of the tin-plate blank.

DETAILED DESCRIPTION OF THE PREFERRED EMBODIMENTS

Figure 1:
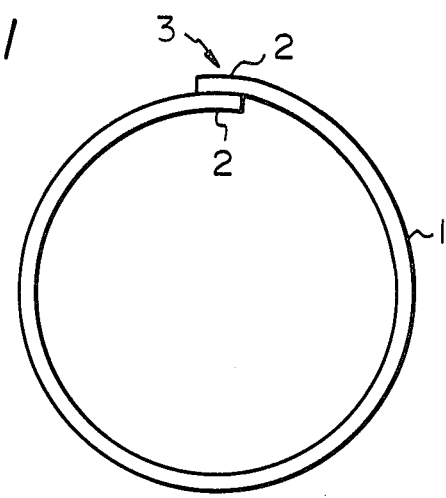
FIG. 1 is a sectional view illustrating one embodiment of the welded can according to the present invention.
Figure 2:
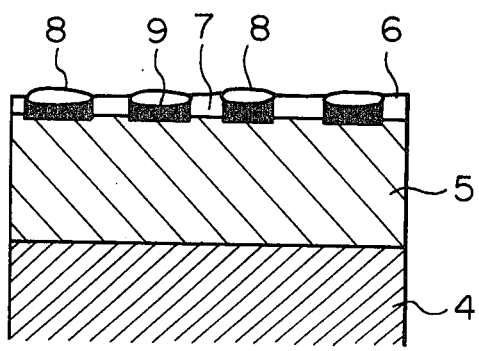
FIG. 2 is an enlarged view showing the section of an instance of the inner and outer surfaces of the side seam in the welded can according to the present invention.

Referring to FIG. 1 illustrating one embodiment of the welded can according to the present invention, a tinplate can blank 1 is formed into a cylinder, and both the side edges 2 are lapped and welded according to specific welding means described hereinafter to form a side seam 3. Referring to FIG. 2 showing an instance of the inner and outer surfaces of the side seam 3 in the enlarged state, the welded can of the present invention has a steel substrate 4, an intermediate layer 5 of an iron-tin alloy formed on the steel substrate 4 and an oxide layer 6 formed on the intermediate layer 5. The welded can of the present invention is characterized in that the thickness of the oxide layer is controlled to 50 to 400 Å and the thickness of the iron-tin alloy layer 5 corresponds to 5 to 100%, particularly 15 to 70%, of the thickness of the whole tin layer.

In an ordinary tinplate blank for use in the manufacture of cans, the thickness of the whole tin layer is 0.38 to 1.52 microns, and an iron-tin alloy layer is necessarily present between the steel substrate and metallic tin layer. The thickness of this iron-tin alloy layer is relatively small and corresponds to 5 to 30% of the thickness of the whole tin layer, though this thickness varies to some extent according to the tinplate manufacturing method. In the conventional welded cans, the metallic tin layer is substantially removed on the surface of the welded portion for the above-mentioned reasons and an iron oxide layer having a thickness of 700 to 3000 Å is formed instead of the removed metallic tin layer.

In contrast, in the welded can according to the present invention, the thickness of the iron-tin alloy layer is increased to 5 to 100% of the thickness of the whole tin layer, and the thickness of the oxide layer is controlled to the above-mentioned small value, that is, 50 to 400 Å. In the welded can according to the present invention, by virtue of the prominently increased thickness of the iron-tin alloy layer, the corrosion resistance of the bonded portion can be remarkably improved and also the appearance characteristic can be prominently improved. Furthermore, since a colorless oxide layer which is very thin and hence, has no bad influence on the appearance is formed on this alloy layer, the adhesion of the coating is remarkably increased, with the result that the corrosion resistance is remarkably improved in a coated can formed from the welded can of the present invention.

As is seen from the foregoing illustration, in the welded can according to the present invention, the appearance of the inner and outer surfaces is not substantially different from that of the tinplate blank, and the reflectance of the inner and outer surfaces is at least 60%, particularly at least 80%, of the reflectance of the tinplate blank.

As is illustrated in Examples given hereinafter, the thickness of the iron-tin alloy layer may be measured according to the fluorescent X-ray method. This thickness can also be measured by a scanning type electron microscope or an X-ray microanalyzer.

In the present invention, the composition of the iron-tin alloy layer is not particularly critical. However, in many cases, the Fe/Sn atomic ratio is in the range of from 1/1 to 1/2. The oxide layer 6 is composed mainly of a continuous layer 7 of iron oxide, and a tin oxide layer 8 or a metallic tin layer 9 may be present in the form of islands or continuous layers in the oxide layer 6.

When the thickness of the iron-tin alloy layer is too small and outside the above-mentioned range, no satisfactory corrosion resistance can be obtained. If the thickness of the oxide layer is too large and outside the above-mentioned range, the appearance characteristic is degraded and the coating adhesion is reduced.

In the welded can according to the present invention, the width of the side seam may be relatively small and is ordinarily in the range of 0.2 to 1.2 mm, though the width is changed to some extent according to the diameter of the can. Accordingly, the amount used of the can blank can be reduced in the present invention. This is one of advantages attained by the present invention. As the tinplate blank, there can be used a tin melt-plated steel sheet and a tin electric-plated steel sheet. As the tin electric-plated sheet, there may be used a reflow tinplate sheet and a non-reflow tinplate sheet. The amount deposited of tin in such tinplate is preferably 1.12 to 11.2 g/m$^2$, and the thickness of the tinplate sheet is preferably 0.15 to 0.50 mm.

In the manufacture of a bright welded seam can of tinplate according to the present invention, there are some requirements to be satisfied. Electric resistance welding of the side seam is accomplished by forming a can blank into a cylinder and passing the lap portion of the cylinder through a pair of electrode rollers or passing the lap portion through a pair of upper and lower electrode rollers via an electrode wire. It is important that this welding operation should be carried out in an inert atmosphere and this inert atmosphere should be maintained until the surface temperature of the welded portion is reduced to 550° C. The feature in which an inert atmosphere, that is, a non-oxidative atmosphere, is adopted as the welding atmosphere and also as the gradual cooling atmosphere results in attainment of two functional effects of reducing the thickness of the oxide layer and increasing the thickness of the alloy layer. If an oxidative atmosphere such as air is used as the welding atmosphere, the fused layer is converted to a tin oxide fume and is removed from the surface of the welded portion, with the result that the protecting cover effect of the tin layer is lost or reduced. Furthermore, the presence of the oxidative atmosphere results in formation of porous iron oxide by oxidation of the iron-tin alloy layer. If an inert atmosphere is used at the welding step and the subsequent gradual cooling step, the protecting cover effect of the tin layer is not reduced but is fully retained and formation of porous iron oxide can be effectively prevented. As the inert atmosphere, there can be mentioned, for example, nitrogen, argon, neon, hydrogen and carbon monoxide. It is preferred that the welding operation be carried out while holding a portion to be welded in a current of an inert gas. Of course, the welding operation may be carried out in a closed vessel filled with an inert gas such as mentioned above.

In order to form a welded seam having inner and outer surfaces having a layer structure specified in the present invention, it is important that the application pressure of the above-mentioned electrode member should be adjusted to 20 to 90 Kg per welding point. In order to perform the electric resistance welding effectively, it is necessary to enhance electric conduction by close contact between the electrode member and the blank or between the lapped portions of the blank. However, increase of such contact pressure results in transfer of metallic tin on the outer surface of the bonded portion to the electrode member or protrusion of metallic tin from the welded portion, and the protecting cover effect of the tin layer is lost. If the application pressure of the electrode member is controlled within the above-mentioned range, good electric conduction can be maintained and the transfer of metallic tin to the electrode member or the protrusion of metallic tin from the welded portion can be controlled to a very low level, and the protecting cover effect of the tin layer can be increased. In the manufacture of the welded can of the present invention, since the application pressure of the electrode member is adjusted to a relatively low level, a care should be taken so that fine convexities and concavity are not present in the lapped portions of the can blank and a good smoothness is retained in these portions. Furthermore, an electrode member having a high dimensional precision and a high finish effect should be used.

As the power source for the electric resistance welding, there can be used any of available power sources of alternating currents, direct currents and rectified currents, and the voltage and current are selected within the ranges customarily adopted in the manufacture of welded cans.

In order to form a welded seam defined in the present invention, it is important that while the outer surface temperature of the welded seam is reduced from the welding temperature (ordinarily in the range of from about 750° to about 1450° C.) to 550° C., the cooling rate should be adjusted to 100° to 900° C./sec. This cooling rate has influences on the thickness of the iron-tin alloy layer and the thickness of the oxide layer. More specifically, if the cooling rate is higher than 900° C./sec, the thickness of the alloy layer is apt to be smaller than the lower limit defined in the present invention and if the cooling rate is lower than 100° C./sec, the thickness of the oxide layer is apt to be larger than the upper limit defined in the present invention. If the cooling rate is controlled within the above-mentioned range, it is possible to impart a good thickness combination capable of providing most preferred characteristics to the oxide layer and the iron-tin alloy layer. Control of the cooling rate on the outer surface of the welded seam can be advantageously performed by adjusting the feed rate of the inert gas. Of course, the cooling rate can be controlled by adjusting the can manufacturing rate (the can feed speed) in an inert gas current fed at a constant speed.

The above-mentioned conditions for the manufacture of the bright welded seam can of the present invention are given by way of example, and the process for manufacturing the welded seam can of the present invention is not limited to the above-mentioned process.

Since the bright welded seam can of tinplate according to the present invention is excellent in the appearance of the seam, the corrosion resistance and the coating adhesion, it can be used in the form of an uncoated can, a partially coated can or a wholly coated can as a vacuum can to be subjected to retort sterilization of the content, an inner pressure can for filling of a carbonated drink or the like or an aerosol vessel.

The excellent effects of the present invention will now be described in detail with reference to the following Examples.

In these Examples, the properties were determined and evaluated according to the following methods.

Measurement Methods (1) Thickness of Surface Oxide Layer

A welded lap portion was cut out from the welded can, and cut-out pieces were bonded with an adhesive tape to form a sample having a size of 8 mm×8 mm. The surface of the sample was etched with Ar gas and the atom concentration ratios of Sn, O and Fe were measured. Oxygen in the oxide was etched at a rate of 15 Å/min, and when the etching was conducted, the atom concentration ratio of oxygen became substantially constant at a level of 10 to 20%. Accordingly, the thickness of the portion where the atom concentration ratio of oxygen was higher than 20% was designated as the thickness of the oxide layer.

(2) Thickness of Alloy Layer

A welded lap portion was cut out from the welded can, and cut-out pieces were bonded with an adhesive tape to form a sample having a size of 15 mm×15 mm. The sample was subjected to an electrolytic treatment in a solution of NaOH to remove free Sn from the surface of the welded portion. Then, the quantity of Sn in the alloy layer was determined by fluorescent X-rays, and the thickness of the alloy layer was calculated based on the assumption that the Sn amount of 1 g/m$^2$ corresponded to 0.144$\mu$ of the thickness of the alloy layer. In case of free Sn, it was presumed that 1 g/m$^2$ corresponded to a thickness of 0.137$\mu$.

(3) Reflectance

A welded lap portion was cut out from the welded can, and 13 cut-out pieces having a length of 20 mm were bonded to form a sample having a size of 10 mm×20 mm. By using a digital angle-varying photometer, light was applied from a direction of 45°, and the reflectance was expressed in terms of a relative value calculated on the assumption that the value of the reflectance of the non-welded portion was 100%.

Evaluation Methods (1) Coating Adhesion

An epoxy type varnish was coated on the welded surface in a thickness of 10 to 15$\mu$ and was then baked (the peak temperature of 300° C. was maintained for 15 seconds). A strip was cut out from the vicinity of the welded portion and the strip was bent by 180° in the welding direction while the coated surface was located outside (one sheet of the same tinplate as the substrate was inserted between the two bent portions of the sample). The coating on the bent part of the welded portion was examined by a microscope.

Evaluation standard

○: small cracks similar to those on the tinplate surface in the portion other than the welded portion Δ: small rising or peeling of the coating X: large rising or peeling of the coating (2) Corrosion resistance A strip was cut out from a part close to the uncoated welded portion, and the cut edge was covered with a tape. The sample was dipped in a solution of a glass cleaner in a pressure bottle and allowed to stand at 50° C. for 2 months. The degree of corrosion of the welded surface was examined and evaluated.

Evaluation standard

○: low degree of corrosion

Δ: medium degree of corrosion

X: high degree of corrosion

EXAMPLE 1

A reflow tinplate sheet having a thickness of 0.23 mm and a plated Sn amount of #25 (free Sn amount on the outer surface side being 2.12 g/m$^2$ and the alloyed Sn amount being 0.60 g/m$^2$) was welded in N$_2$ gas current and formed into a welded can under the following conditions.

Welding conditions

Electrode: Cu wire

Lap width: 0.8 mm

Welding speed: 15 m/min

Application pressure of electrode: 50 Kg

Voltage on primary side: 200 V

Surface cooling rate to 550° C. in welded portion: 800° C./sec

The thickness of the surface oxide layer on the outer surface portion, the amount (thickness) of the alloy layer and the reflectance were determined.

The obtained results are shown in Table 1.

Comparative Example 1

The same tinplate sheet as used in Example 1 was seam-welded under the same conditions as in Example 1 except that N$_2$ gas was not used but welding was carried out in air. The obtained results are shown in Table 1.

EXAMPLE 2

A reflow tinplate sheet having a thickness of 0.23 mm and a plated Sn amount of #50 (the free Sn amount being 5.16 g/m² on the inner face side and the alloyed Sn amount being 0.76 g/m²) was welded in N₂ gas current under conditions described below, and the measurements were carried out in the same manner as described in Example 1. The obtained results are shown in Table 1.

Welding conditions
Electrode: Cu wire
Lap width: 0.4 mm
Welding speed: 30 m/min
Application pressure of electrode: 40 Kg
Voltage on primary side: 210 V
Surface cooling rate to 550° C. in welded portion: 300° C./sec Comparative Example 2

The same tinplate sheet as used in Example 2 was seam-welded under the same conditions as described in Example 2 except that N₂ gas was not used but welding was carried out in air. The obtained results are shown in Table 1.

EXAMPLE 3

A reflow tinplate sheet having a thickness of 0.21 mm and a plated Sn amount of #25 (the free Sn amount on the inner face side being 2.40 g/m² and the alloyed Sn amount being 0.43 g/m²) was welded in Ar gas current under the same conditions as described in Example 2. The obtained results are shown in Table 1.

Comparative Example 3

The same tinplate sheet as used in Example 3 was seam-welded under the same conditions as in Example 3 except that Ar gas was not used but welding was carried out in air. The obtained results are shown in Table 1.

as in Example 1. Furthermore, the coating adhesion and corrosion resistance were evaluated.

Welding conditions
Electrode: Cu wire
Lap width: 0.4 mm
Welding speed: 35 m/min
Application pressure of electrode: 55 Kg
Welding current: 6700 A
Surface cooling rate to 550° C. in welded portion: 150° C./sec Comparative Example 4

The same tinplate sheet as used in Example 4 was seam-welded under the same conditions as in Example 4 except that N₂ gas was not used but welding was carried out in air.

The measurement results obtained in each Example are shown in Table 1, and the evaluation results in each Example are shown in Table 2.

With respect to products obtained in Example 4 and Comparative Example 4, the atom concentration ratios of Sn, O and Fe were determined while etching the surface of the welded portion according to ESCA (electron spectroscopy for chemical analysis). The obtained results are shown in FIGS. 3 and 4, respectively.

Figure 3:
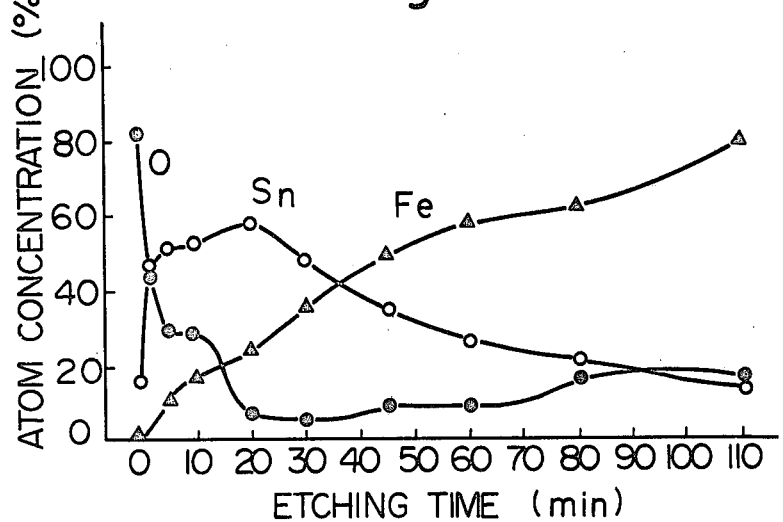
FIG. 3 is a graph illustrating the relation between the etching time and the atom concentration in the welded side seam obtained in Example 4.
Figure 4:
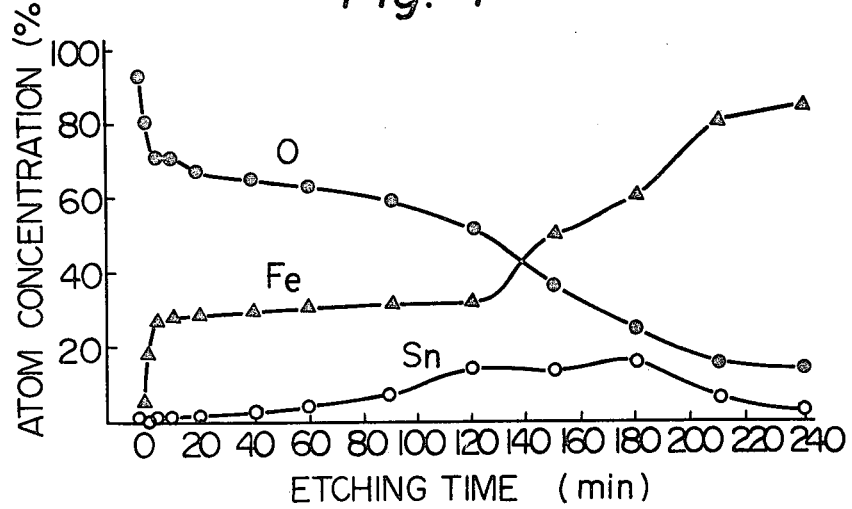
FIG. 4 is a graph illustrating the relation between the etching time and the atom concentration in the welded side seam obtained in Comparative Example 4.

In FIGS. 3 and 4, the etching time on the abscissa corresponds to the depth from the outer surface of the seam. When the results shown in FIG. 3 are compared with those shown in FIG. 4, it is seen that in the conventional welded can, the oxide layer is formed to a deeper interior and metallic tin is considerably lost, while in the welded can according to the present invention, formation of the oxide layer is limited to a very thin portion in the outer surface and metallic tin is effectively retained in the form of an alloy layer.

TABLE 1

| Example | Surface Measured | Measurement Results | | | Thickness Ratio (%) of Alloy Layer to Plating Layer | Reflectance (%) |
| --- | --- | --- | --- | --- | --- | --- |
| | | Thickness (Å) of Surface Oxide Layer | Alloyed Sn Amount (g/m²) | Thickness (μ) of Alloy Layer | | |
| Example 1 | outer surface | 400 | 0.16 | 0.021 | 6 | 80 |
| Comparative Example 1 | outer surface | 1000 | 0.12 | 0.016 | 4 | 20 |
| Example 2 | inner surface | 50 | 5.89 | 0.787 | 97 | 98 |
| Comparative Example 2 | inner surface | 800 | 0.85 | 0.114 | 14 | 25 |
| Example 3 | inner surface | 150 | 2.10 | 0.281 | 73 | 93 |
| Comparative Example 3 | inner surface | 1600 | 0.36 | 0.052 | 13 | 18 |
| Example 4 | inner surface | 220 | 0.97 | 0.140 | 36 | 65 |
| Comparative Example 4 | inner surface | 2800 | 0.35 | 0.050 | 13 | 15 |

1.

EXAMPLE 4

A reflow tinplate sheet of temper T-4 having a thickness of 0.23 mm and a plated Sn amount of #25 (the free Sn amount on the inner face side being 2.14 g/m² and the alloyed Sn amount being 0.66 g/m²) was welded in N₂ gas current under welding conditions described below. The thickness of the surface oxide layer on the inner surface portion of the lap, the amount (thickness) of the alloy layer and the reflectance were determined

TABLE 2

| Example | Surface Evaluated | Evaluation Results | |
| --- | --- | --- | --- |
| | | Coating Adhesion | Corrosion Resistance |
| Example 1 | outer surface | O - Δ | O - Δ |
| Comparative Example 1 | " | X | X |
| Example 2 | inner surface | O | O |
| Comparative Example 2 | " | X - Δ | X - Δ |
| Example 3 | " | O | O |
| Comparative Example 3 | " | X | X |
| Example 4 | " | O | O |

TABLE 2-continued

| Example | Surface Evaluated | Evaluation Results | |
| --- | --- | --- | --- |
| | | Coating Adhesion | Corrosion Resistance |
| Comparative Example 4 | " | X | X |

What is claimed is:

1. A bright welded seam can of tinplate having a side seam formed by welding a tin plate blank, wherein each of the inner and outer surfaces of said side seam has an outermost surface layer having a thickness of 50 to 400 Å and being composed of oxides and a subsequent intermediate layer composed of an iron-tin alloy, which has a thickness corresponding to 5 to 100% of the thickness of the whole tin layer in the tinplate blank, and wherein said inner and outer surfaces of the side seam have a reflectance corresponding to at least 60% of the reflectance of the tinplate blank.

2. A welded seam can as set forth in claim 1 wherein the thickness of the iron-tin alloy layer corresponds to 15 to 70% of the thickness of the whole tin layer in the tinplate blank.

3. A welded seam can as set forth in claim 1 wherein the tinplate blank has a plated tin amount of 1.12 to 11.2 g/m$^2$ and a thickness of 0.15 to 0.50 mm.

4. A welded seam can as set forth in claim 1 wherein the width of the side seam is 0.2 to 1.2 mm.

* * * * *